US010558664B2

(12) United States Patent
Armbrust et al.

(10) Patent No.: US 10,558,664 B2
(45) Date of Patent: Feb. 11, 2020

(54) STRUCTURED CLUSTER EXECUTION FOR DATA STREAMS

(71) Applicant: Databricks Inc., San Francisco, CA (US)

(72) Inventors: Michael Armbrust, Berkeley, CA (US); Tathagata Das, Berkeley, CA (US); Shi Xin, San Francisco, CA (US); Matei Zaharia, Palo Alto, CA (US)

(73) Assignee: Databricks Inc., San Francisco, CA (US)

( * ) Notice: Subject to any disclaimer, the term of this patent is extended or adjusted under 35 U.S.C. 154(b) by 268 days.

(21) Appl. No.: 15/581,647

(22) Filed: Apr. 28, 2017

(65) Prior Publication Data

US 2018/0314732 A1    Nov. 1, 2018

(51) Int. Cl.
*G06F 16/2453*    (2019.01)
*G06F 16/2455*    (2019.01)

(52) U.S. Cl.
CPC .. *G06F 16/24542* (2019.01); *G06F 16/24568* (2019.01)

(58) Field of Classification Search
CPC ......... G06F 16/24542; G06F 16/24568; G06F 16/2453; G06F 16/2455; G06F 16/24532
USPC ....................................................... 707/718
See application file for complete search history.

(56) References Cited

U.S. PATENT DOCUMENTS

| | | | | |
|---|---|---|---|---|
| 2007/0226186 A1* | 9/2007 | Ewen | ................ | G06F 16/24542 |
| 2014/0095471 A1* | 4/2014 | Deshmukh | ........ | G06F 16/24568 707/714 |
| 2015/0154256 A1* | 6/2015 | McKenna | ......... | G06F 16/24542 707/718 |
| 2015/0169683 A1* | 6/2015 | Chandramouli | .... | G06F 16/2477 707/713 |
| 2015/0379083 A1* | 12/2015 | Lang | ................. | G06F 16/24526 707/722 |
| 2016/0004751 A1* | 1/2016 | Lafuente Alvarez | .... | G06N 5/04 707/718 |
| 2017/0116210 A1* | 4/2017 | Park | .................... | G06F 11/1471 |
| 2017/0116289 A1* | 4/2017 | Deshmukh | ........ | G06F 16/24535 |

* cited by examiner

*Primary Examiner* — Syed H Hasan
*Assistant Examiner* — Nicholas E Allen
(74) *Attorney, Agent, or Firm* — Van Pelt, Yi & James LLP

(57) ABSTRACT

A system for executing a streaming query includes an interface and a processor. The interface is configured to receive a logical query plan. The processor is configured to determine a physical query plan based at least in part on the logical query plan. The physical query plan comprises an ordered set of operators. Each operator of the ordered set of operators comprises an operator input mode and an operator output mode. The processor is further configured to execute the physical query plan using the operator input mode and the operator output mode for each operator of the query.

22 Claims, 8 Drawing Sheets

STRUCTURED CLUSTER EXECUTION FOR DATA STREAMS

BACKGROUND OF THE INVENTION

Streaming data processing is an important big data processing application. In a streaming data processing application, data is regularly received and data processing results are desired at a regular output frequency. The data processing results are typically dependent both on newly received data and historical data (e.g., previously received data). A traditional big data processor processes the data by combining the newly received data with the historical data and executing a data processing query on the big data set. The full results of the query are determined and output at the desired output frequency. Performing the full query repeatedly on the large and ever-growing data set can require a large amount of computational power.

BRIEF DESCRIPTION OF THE DRAWINGS

Various embodiments of the invention are disclosed in the following detailed description and the accompanying drawings.

DETAILED DESCRIPTION

Figure 1:
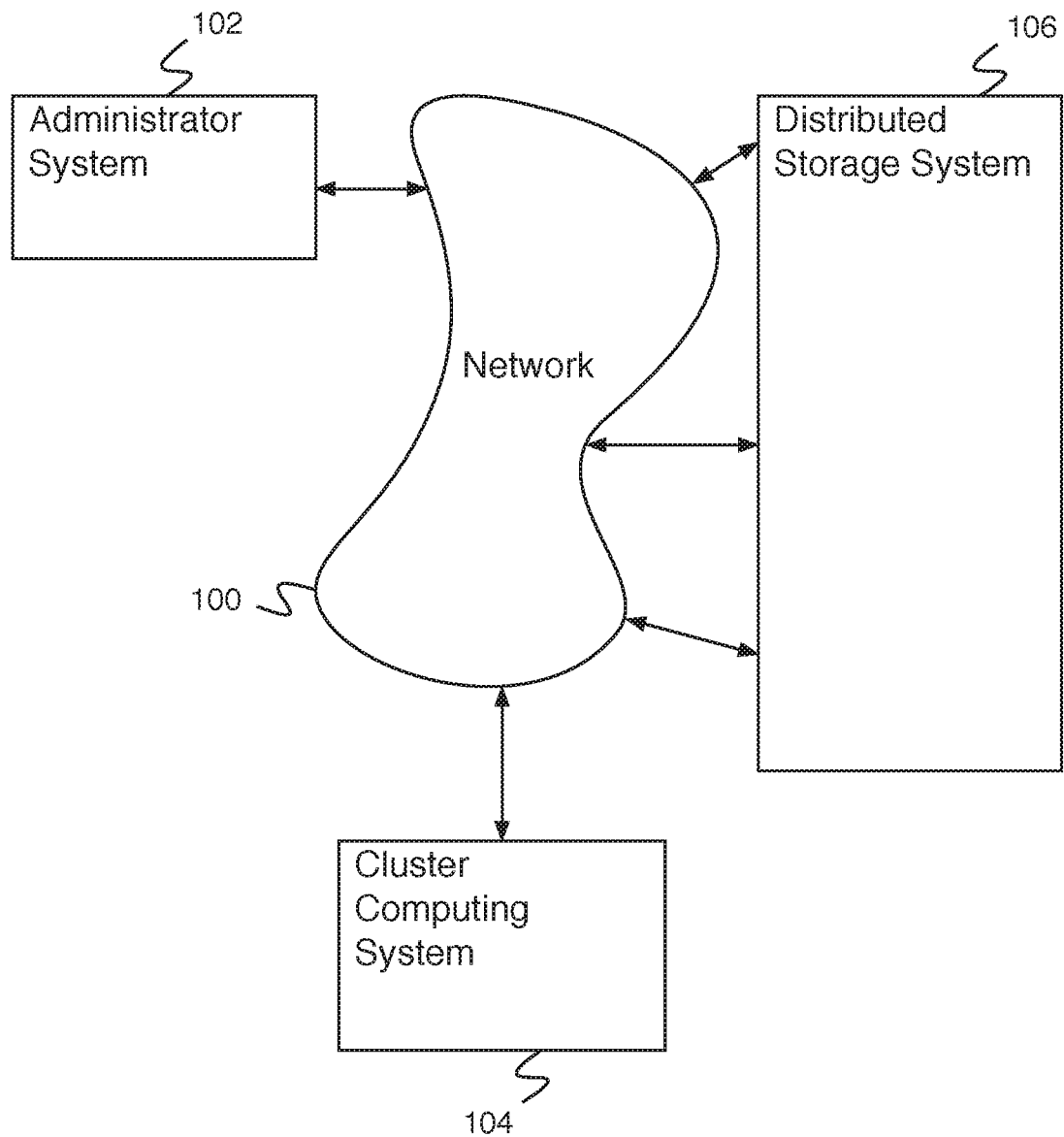
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for executing a streaming query is disclosed. The system comprises an interface and a processor. The interface is configured to receive a logical query plan. The processor is configured to determine a physical query plan based at least in part on the logical query plan. The physical query plan comprises an ordered set of operators. Each operator of the ordered set of operators comprises an operator input mode and an operator output mode. The physical query plan is executed using the operator input mode and the operator output mode for each operator of the query. In some embodiments, a system for executing a streaming query additionally comprises a memory coupled to the processor and configured to provide the processor with instructions.

In some embodiments, a system for executing a streaming query comprises a system for repeatedly executing a query on a data set. At a regular or irregular interval, data is received by the system and combined with state stored while processing previous data to form a table. A query or a set of queries is then executed on the data set. The query comprises a set of operators for performing operations (e.g., filter, map, sort, join, aggregate, etc.). Each operator is associated with one or more data processing mode options. A data processing mode option comprises an operator input mode and an operator output mode. An operator input mode and an operator output mode comprise subsets of the available input data and output data expected by the operator as input and provided by the operator as output. In some embodiments, the operators are indicated in a physical query plan as a directed graph of operators.

In some embodiments, modes associated with an operator describe how the output of an operator at each trigger interval is related to the full answer of the query. Any streaming query can be executed correctly simply by storing all the data that arrives in a table and executing the full query over the entire table for each data update. In this case, the full query plan is operating in a complete mode. The complete mode processes all of the input data and outputs the entire result of the query plan. This mode is the only choice for batch operations in a traditional big data processing system, which is only allowed to produce a single results set. However, this mode is inefficient as each subsequent processing of data may repeat calculations and the processing time will continue to increase as more and more data is added to the data set. Fragments of a streaming query may also run in complete mode. Since producing the entire output of the query at each trigger interval would likely be very expensive, the system also defines several optimized output modes that can be used when executing a streaming query: delta mode, append mode, and update mode. Delta mode incrementally outputs results at user specified intervals comprising instructions to add rows to the output table or delete them from the output table. Any unchanged rows from the output table are not output. Append mode comprises a subset of delta mode that only outputs new rows to the output table and does not output instructions to delete rows. Rows output by append mode are guaranteed to not change.

Update mode comprises an extension to append mode that outputs new rows to the output table as in append mode and also is able to output modifications to only a set of rows (e.g., one row).

In some embodiments, a system user provides a logical query for streaming execution to the streaming system. The streaming system converts the logical query to an ordered set of operators each associated with an input and output mode for each operator. In some embodiments, a logical query is converted to a set of operators using one or more strategies. Strategies comprise a set of functions that return an ordered set of operators given some logical plan fragment. Strategies operate by looking for a pattern of one or more operators indicated by a fragment of the query. When there are remaining operators that serve as input to the matched operators, the planner can operate recursively given a list of acceptable input modes. The ordering of both the application of the strategies and the returned physical plans acts as a heuristic for which query plans to cost first.

In some embodiments, the following are example operators. For each operator, the possible modes are listed that an operator can accept as input as well as the modes that is can output. In some embodiments, the restrictions are based on a combination of intrinsic properties of the operation being performed (i.e., sorting is meaningless when the total set of data is not output) and the specifics of the implementation (i.e., aggregation must maintain state across batches if it doesn't operate in complete mode). In the following, an input mode for an operator is shown on the left side of '→' and an output mode for an operator is shown on the right side of '→'. In addition, the C stands for complete, A stands for append, U stands for update, and D stands or delta:

Filter: C→C; A→A; U→U; D→D;
Map: C→C; A→A; U→U; D→D;
Aggregate: C→C;
Top-K: C→C;
Stateful Top-K: A→D; A→C;
Sort: C→C;
Limit: C→C;
StatefulAggregate: A→U; A→D; A→C;
StatefulAggregate (with watermark): A→A; A→U; A→D; A→C;
StatefulAggregate (algebraic): D→D;
Join: (C, C)→C; (A, C)→A; (C, A)→A;
Left Outer Join: (C, C)→C; (A, C)→A;
SaveRestore: A→C; U→C; D→C;

In some embodiments, using the list of strategies different query plans can be constructed. A choice is made from the different possible ordered sets of operators using a cost model. This cost model is similar to a standard cost model. In some embodiments, processing costs are given relative to the expected batch size for non-complete mode operation, and the expected size of the state that is stored across triggers is tracked given an infinite stream.

FIG. 1 is a block diagram illustrating an embodiment of a network system. In some embodiments, the network system of FIG. 1 comprises a system for executing a streaming query. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, cluster computing system 104, and distributed storage system 106 communicated via network 100. In the example shown, administrator system 102 comprises an administrator system for use by an administrator. In various embodiments, administrator system 102 comprises an administrator system for executing administrator commands, for executing jobs using cluster computing system 104, for executing a streaming query on cluster computing system 104, for querying the status of jobs on cluster computing system 104, for storing data on distributed storage system 106, for retrieving data from distributed storage system 106, or for any other appropriate administrator system purpose. Cluster computing system 104 comprises a cluster computing system for executing cluster computing jobs. In some embodiments, cluster computing system 104 comprises a cluster computing system for executing a streaming query. In various embodiments, cluster computing system 104 comprises a computer, a multiprocessor computer, a plurality of computers, a plurality of multiprocessor computers, or any other appropriate cluster computing system. In some embodiments, one or more computers of cluster computing system 104 store data of cluster computing jobs on distributed storage system 106. Distributed storage system 106 comprises a distributed storage system for storing data. In some embodiments, distributed storage system 106 comprises a commercially provided distributed storage system service (e.g., Amazon™ S3). Distributed storage system 106 comprises a plurality of storage systems. In some embodiments, distributed storage system 106 comprises a plurality of storage systems distributed geographically. In some embodiments, the plurality of storage systems of distributed storage system 106 communicate via network 100.

Figure 2:
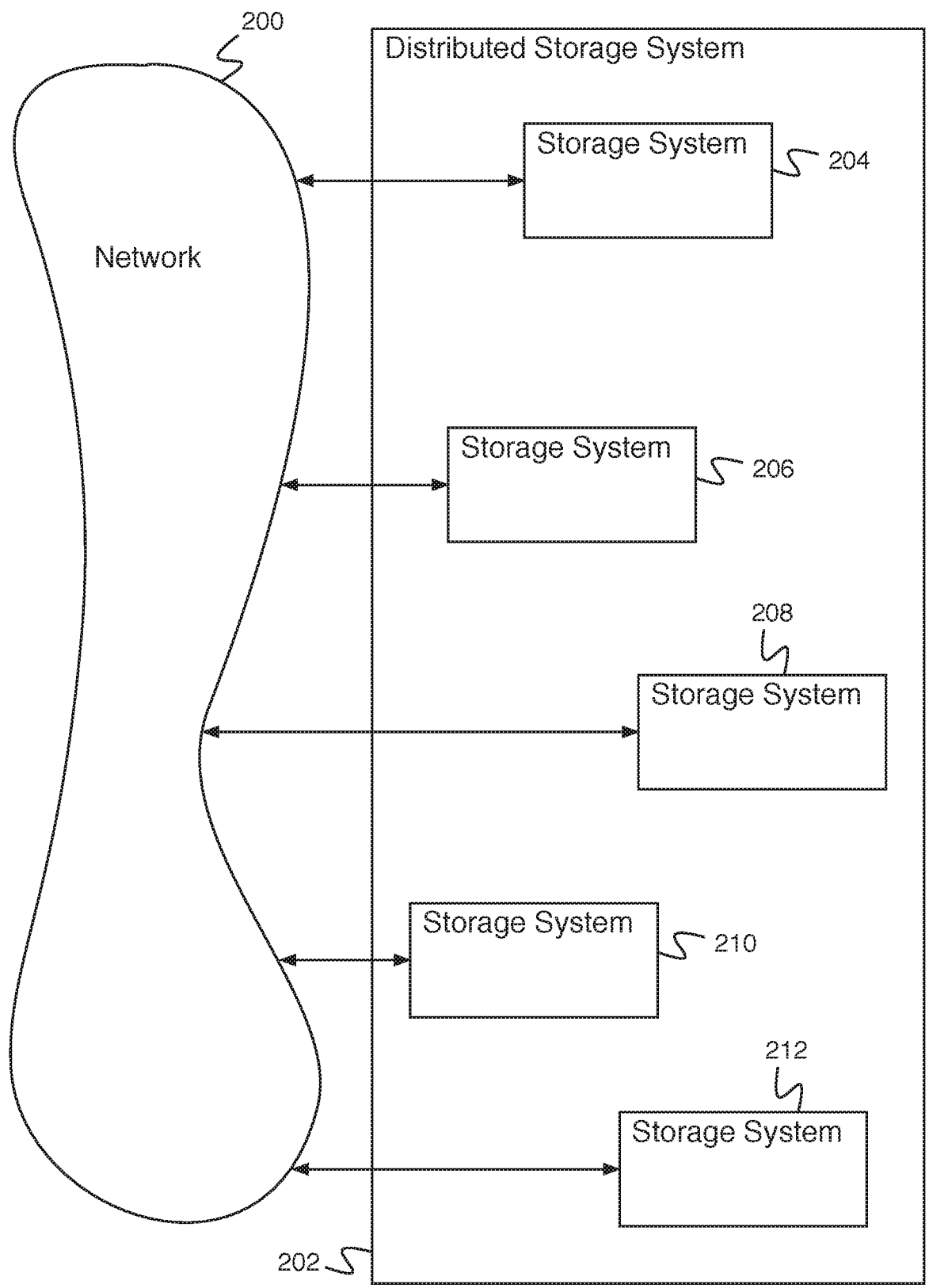
FIG. 2 is a block diagram illustrating an embodiment of a distributed storage system.

FIG. 2 is a block diagram illustrating an embodiment of a distributed storage system. In some embodiments, distributed storage system 202 comprises distributed storage system 106 of FIG. 1 and network 200 comprises network 100 of FIG. 1. In the example shown, distributed storage system 202 comprises a plurality of storage systems (e.g., storage system 204, storage system 206, storage system 208, storage system 210, and storage system 212). The storage systems of distributed storage system 202 communicate via network 200. In some embodiments, storage systems of distributed storage system 202 are distributed geographically (e.g., across an organization campus, across a country, across the world, etc.). When a storage system user (e.g., a user or administrator system, a cluster computing system, etc.) accesses distributed storage system 202 via network 200, the user is put in communication with a storage system of distributed storage system 202. In various embodiments, the user is put in communication with the storage system that is closest to the user, that is least loaded, that is most up to date, that has be accessed least recently, or any other appropriate storage system. In some embodiments, distributed storage system 202 ensures that each of the plurality of storage systems behaves the same (e.g., provides the same data in response to a read data command). In some embodiments, data is mirrored between storage systems of distributed storage system 202 (e.g., each storage system stores the same data). In some embodiments, data is consistent between storage systems only eventually (e.g., when a change is made to one storage system, it is reflected when querying another storage system, but only after a period of time has elapsed for the change to be copied). In some embodiments, data is stored within distributed storage system 202 using a directory tree structure.

Figure 3:
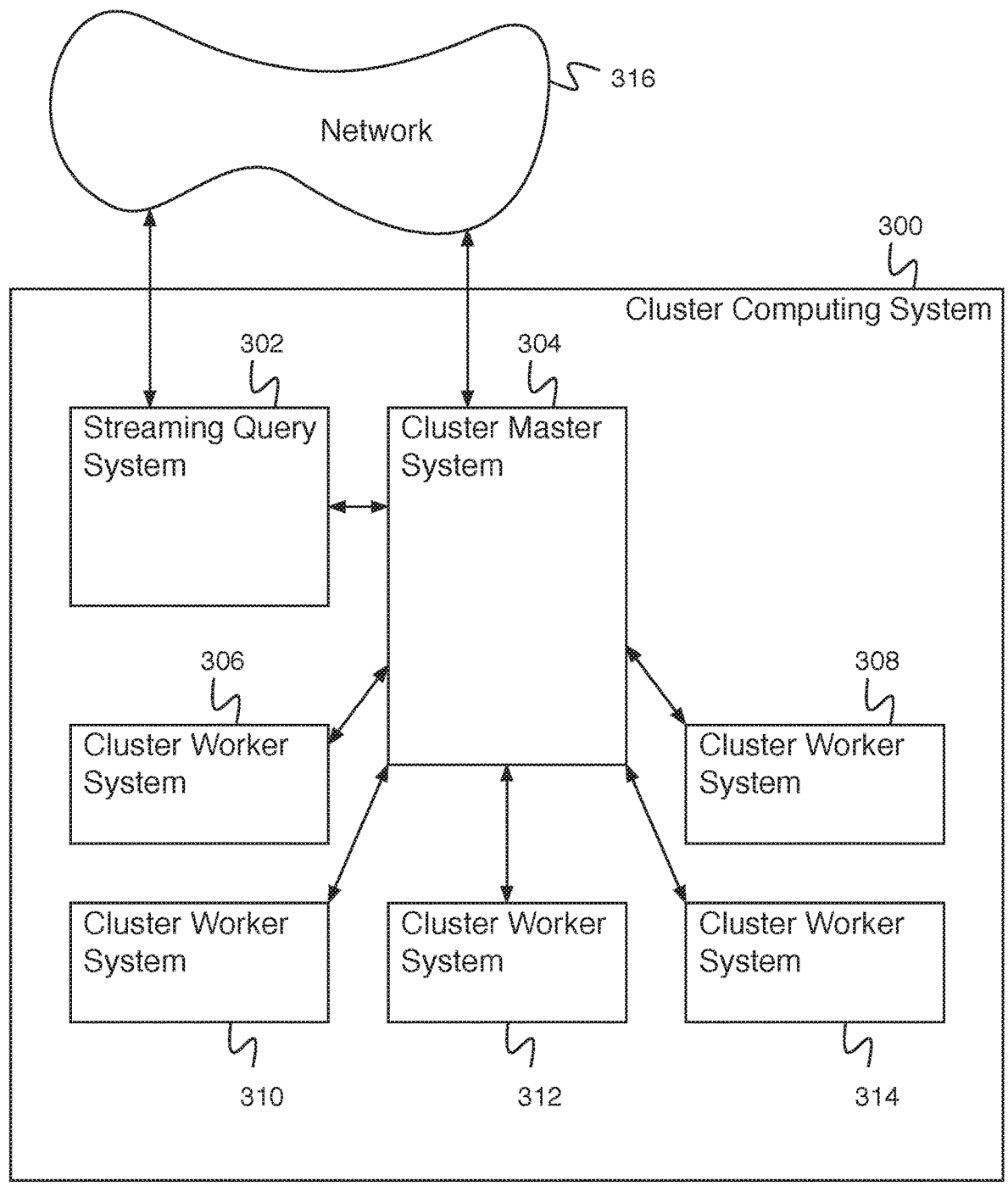
FIG. 3 is a block diagram illustrating an embodiment of a cluster computing system.

FIG. 3 is a block diagram illustrating an embodiment of a cluster computing system. In some embodiments, cluster computing system 300 comprises cluster computing system 104 of FIG. 1 and network 316 comprises network 100 of FIG. 1. Streaming query system 302 comprises a system for executing a streaming query. In various embodiments, streaming query system 302 comprises a system for receiving streaming query information (e.g., a logical query plan, a set of input sources, an input location, a trigger interval, an output data location, etc.), for determining an ordered set of operators (e.g., based at least in part on a logical query plan), for determining input and output modes for operators of the ordered set of operators, for determining parallelism for operators of the ordered set of operators, for executing a query plan, for determining whether to modify a query plan, or for any other appropriate purpose. In some embodiments, streaming query system 302 is implemented using a processor. Cluster master system 304 communicates with one or more network entities (e.g., a user system, an administrator system, a distributed storage system, an application server, another cluster computing system, etc.) via network 316. In various embodiments, cluster computing system 300 receives a cluster computing job from an administrator system, divides the cluster computing job into a set of cluster worker jobs, provides each of the cluster worker jobs to a cluster worker system (e.g., cluster worker system 306, cluster worker system 308, cluster worker system 310, cluster worker system 312, or cluster worker system 314), receives cluster worker job results, stores cluster worker job results (e.g., on a distributed storage system), determines that a cluster computing job has been completed, stores a job completed indication (e.g., on a distributed storage system), combines cluster worker job results to determine a cluster computing job result, provides the cluster computing job result, or performs any other appropriate cluster computing job action. In some embodiments, cluster master system 304 is implemented using one or more processors. In some embodiments, each of cluster worker system 306, cluster worker system 308, cluster worker system 310, cluster worker system 312, and cluster worker system 314 are each implemented using one or more processors. In various embodiments, the elements of cluster computing system 300 are each implemented using their own processor, are each implemented using their own computing system, are each implemented using a multiprocessor computing system, are combined onto a single processor, or are combined onto a plurality of processors in any other appropriate way.

Figure 4:
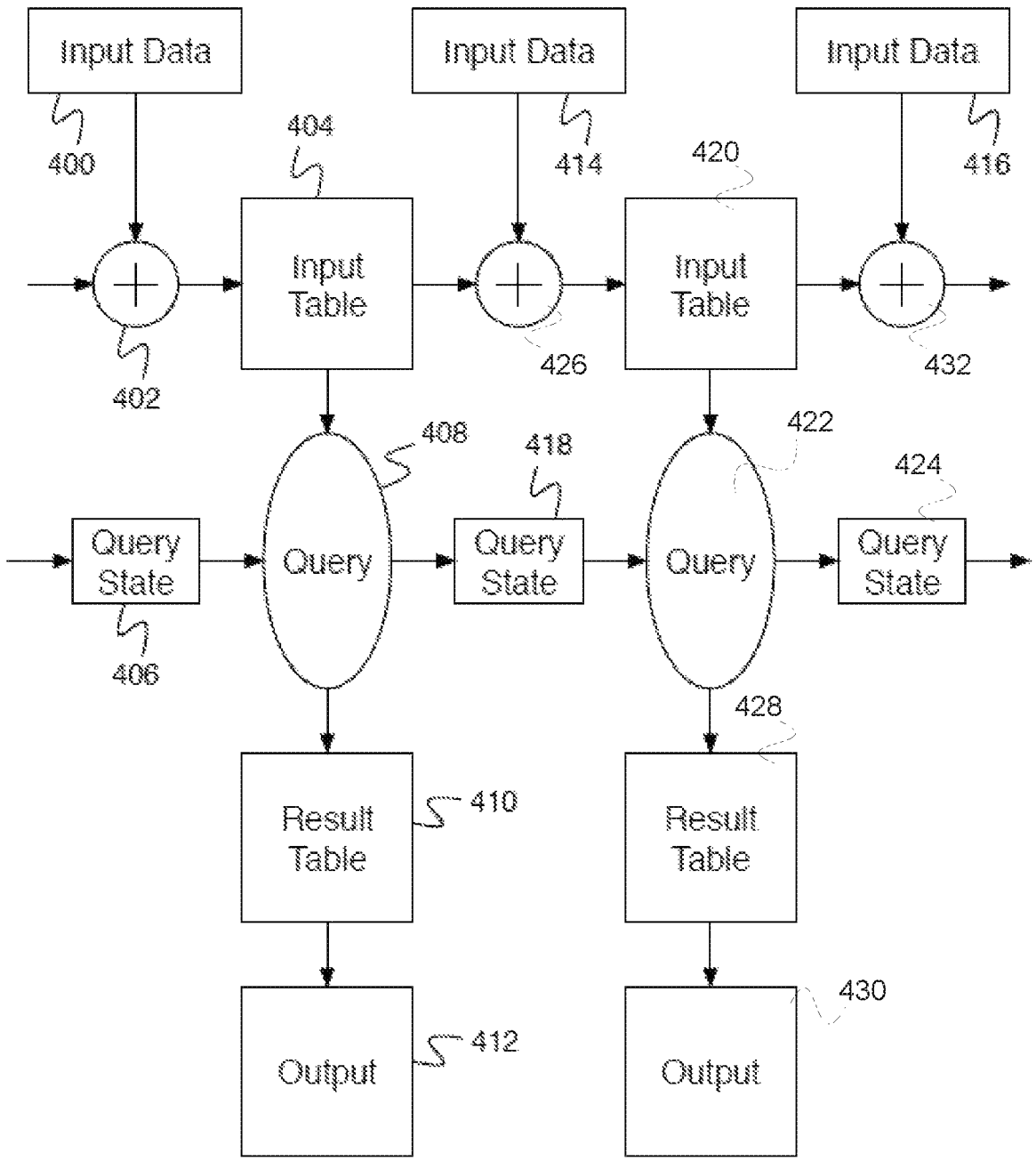
FIG. 4 is a data flow diagram illustrating an embodiment of a streaming computation.

FIG. 4 is a data flow diagram illustrating an embodiment of a streaming computation. In some embodiments, the streaming computation of FIG. 4 is designed to be executed using a cluster computing system (e.g., cluster computing system 104 of FIG. 1). In the example shown, input data 400 is received. Input data 400 comprises data received during a first time increment (e.g., data received between $t=t_1$ and $t=t_2$). In the example shown, input data 414 comprises data received during a second time increment (e.g., data received between $t=t_2$ and $t=t_3$) and data 414 comprises data received during a third time increment (e.g., data received between $t=t_3$ and $t=t_4$). Input data is combined with previous input data using combiner 402 to form input table 404. Each time increment, received data is combined with a previous input table to form a new input table. Input table 404 is input to query 408 for processing. Query 408 additionally receives query state 406, the output of a previous iteration of the query. Query 408 operates to produce result table 410 and query state 418. In some embodiments, query 408 comprises an ordered set of operators. In some embodiments, query 408 is optimized for streaming operation. Result table 410 comprises the query result. In some embodiments, output 412 comprises a version of result table 410 modified for the data storage location for storing the data output (e.g., output 412 comprises a delta mode version of result table 410). In the example shown, the streaming query (e.g., query 408) is run once per time increment. In some embodiments, multiple instances of the streaming query execute in parallel. Similarly, input data 414 is combined with input table 404 using combiner 426 and used to generate input table 420. Input table 420 and query state 418 are input to query 422 to produce result table 428 and query state 424. Output 430 is generated from result table 428. Subsequent input data 416 is similarly combined using combiner 432 into an input table and processed along with query state 424 data.

Figure 5:
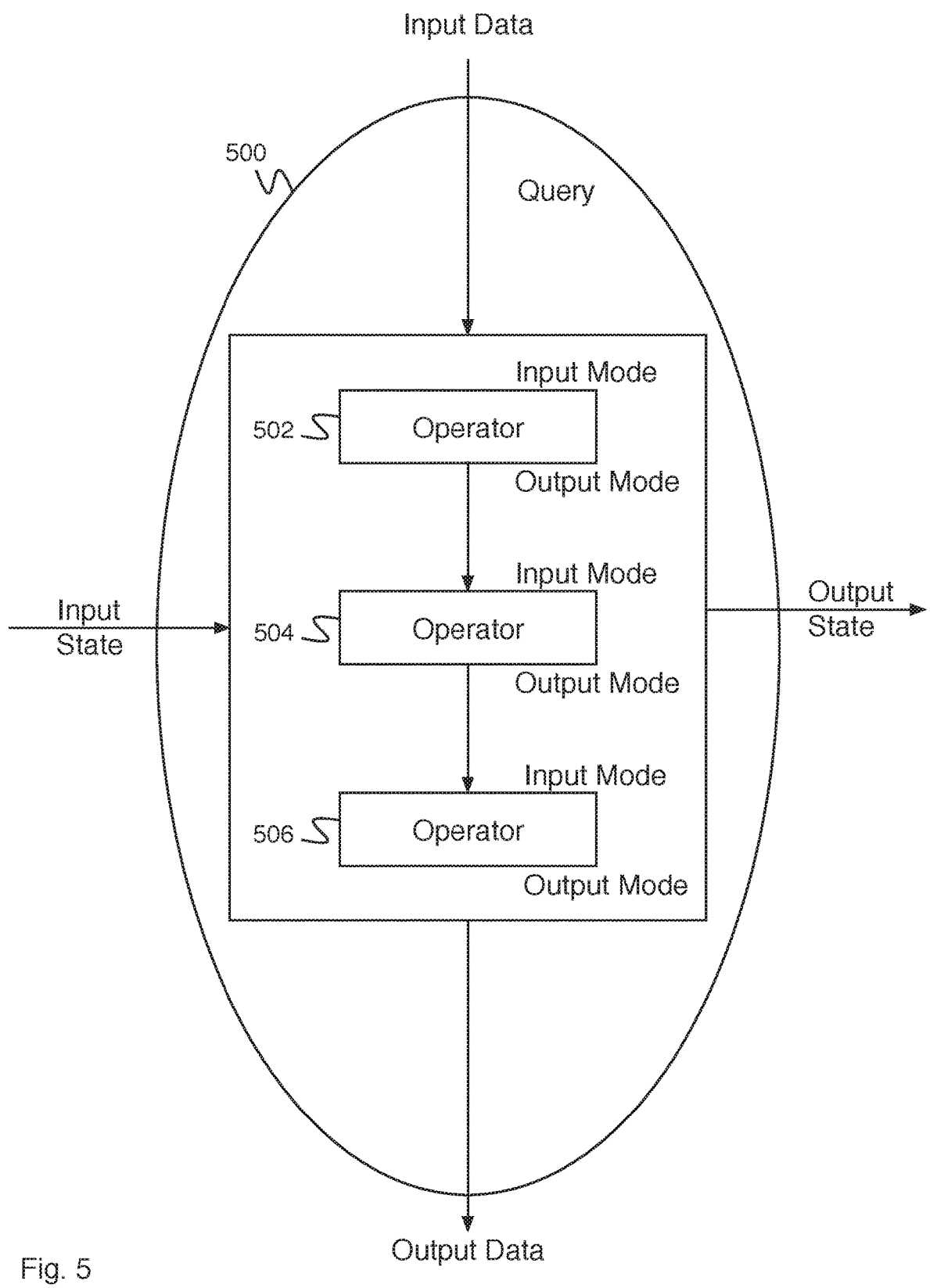
FIG. 5 is a data flow diagram illustrating an embodiment of a query.

FIG. 5 is a data flow diagram illustrating an embodiment of a query. In some embodiments, query 500 implements query 408 or query 422 of FIG. 4. In the example shown, query 500 receives input data (e.g., from an input table) and input state information (e.g., query state information from previous query processing) and provides output data and output state information. Query 500 is implemented using an ordered set of operators (e.g., operator 502, operator 504, and operator 506). Each operator of the ordered set comprises an input mode and an output mode. In some embodiments, the input mode of an operator is the same as the output mode of a previous operator (e.g., the input mode of operator 504 is the same as the output mode of operator 502). In some embodiments, the ordered set of operators is chosen to implement a logical query plan. In some embodiments, one or more operators of the ordered set of operators comprises a parallelism level (e.g., a number of cluster machines to execute the operator on, a number of data points per cluster machine, etc.).

Figure 6:
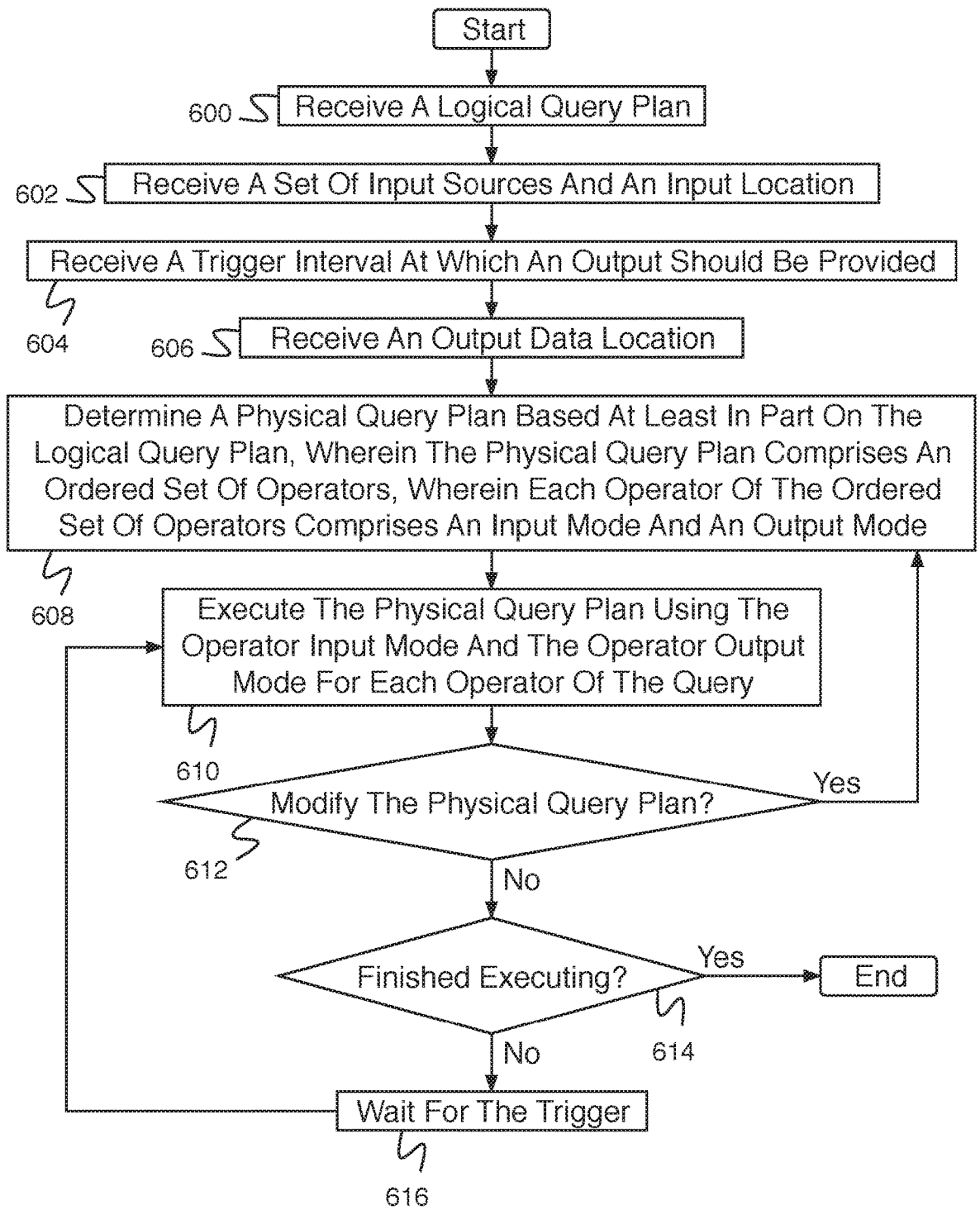
FIG. 6 is a flow diagram illustrating an embodiment of a process for executing a streaming query.

FIG. 6 is a flow diagram illustrating an embodiment of a process for executing a streaming query. In some embodiments, the process of FIG. 6 is executed by streaming query system 302 of FIG. 3. In the example shown, in 600, a logical query plan is received. For example, a logical query plan is received from a user using a user system. A logical query plan comprises a description of a streaming query. In various embodiments, a logical query plan indicates a set of operators for executing the query, indicates a set of tasks that are able to be executed by a set of operators or indicates a set of commands, wherein each command can be executed by one or more operators or corresponds to operators in any other appropriate way. In 602, a set of input sources and an input location are received. For example, a set of input sources and an input location are received from a user using a user system. Input sources comprise processes and/or users creating data for processing by a streaming query. An input location comprises a data storage location for accessing data for processing using a streaming query. In some embodiments, an input location comprises a location on a distributed storage system (e.g., distributed storage system 106 of FIG. 1). In 604, a trigger interval at which output should be provided is received. For example, a trigger interval is received from a user using a user system as to when the system is to produce output. A trigger interval comprises a repetition period of the query execution. In various embodiments, the trigger interval comprises once per minute, once per 30 minutes, each time an input is received, as often as possible, or any other appropriate trigger interval. In 608, an output data location is received. For example, an output data location comprises a location for storing query results. In some embodiments, an output data location comprises a distributed storage system (e.g., distributed storage system 106 of FIG. 1). In 608, a physical query plan is determined based at least in part on the logical query plan, wherein the physical query plan comprises an ordered set of operators, and wherein each operator of the ordered set of operators comprises an input mode and an output mode. For example, the ordered set of operators comprises an ordered set of streaming execution operators for executing the query indicated by the logical query plan. In some embodiments, one or more operators of the ordered set of operators comprises an operator parallelism (e.g., a distribution of the operator job across multiple computers—for example, multiple cluster worker systems of FIG. 3). In some embodiments, the ordered set of operators comprises a directed graph of operators. In 610, the physical query plan is executed using the operator input mode and the operator output mode for each operator of the query. For example, executing the query plan comprises executing the operators of the ordered set of operators in the order indicated. Using the operator input mode and the operator output mode comprises only expecting a subset of an input table as input to the operator, as indicated by the input mode, and only outputting from the operator a subset of the complete output table, as indicated by the output mode. In 612, it is determined whether to modify the physical query plan. For example, the query plan can be modified in order to achieve better performance on future iterations of the streaming query. In various embodiments, modifying the physical query plan comprises determining a different ordered set of operators, determining one or more different input modes and/or output modes, determining a different parallelism, or modifying the physical query plan in any other appropriate way. In the event it is determined to modify the physical query plan, control passes to 608. In the event it is determined not to modify the physical query plan, control passes to 614. In 614, it is determined whether the process has finished executing. In various embodiments, the process finishes executing in response to a stop executing command, at a particular time, in response to receiving a particular data set, when data has stopped being received, or in response to any other indication to stop executing. In the event it is determined that the process has finished executing, the process ends. In the event it is determined that the process has not finished executing, control passes to 616. In 616, the process waits for the trigger (e.g., the trigger defined by the trigger interval received in 604). In some embodiments, the trigger occurs at the trigger interval since the last time the trigger was received. In some embodiments, the process does not wait for a trigger interval and proceeds as soon as possible. Control then passes to 610.

Figure 7:
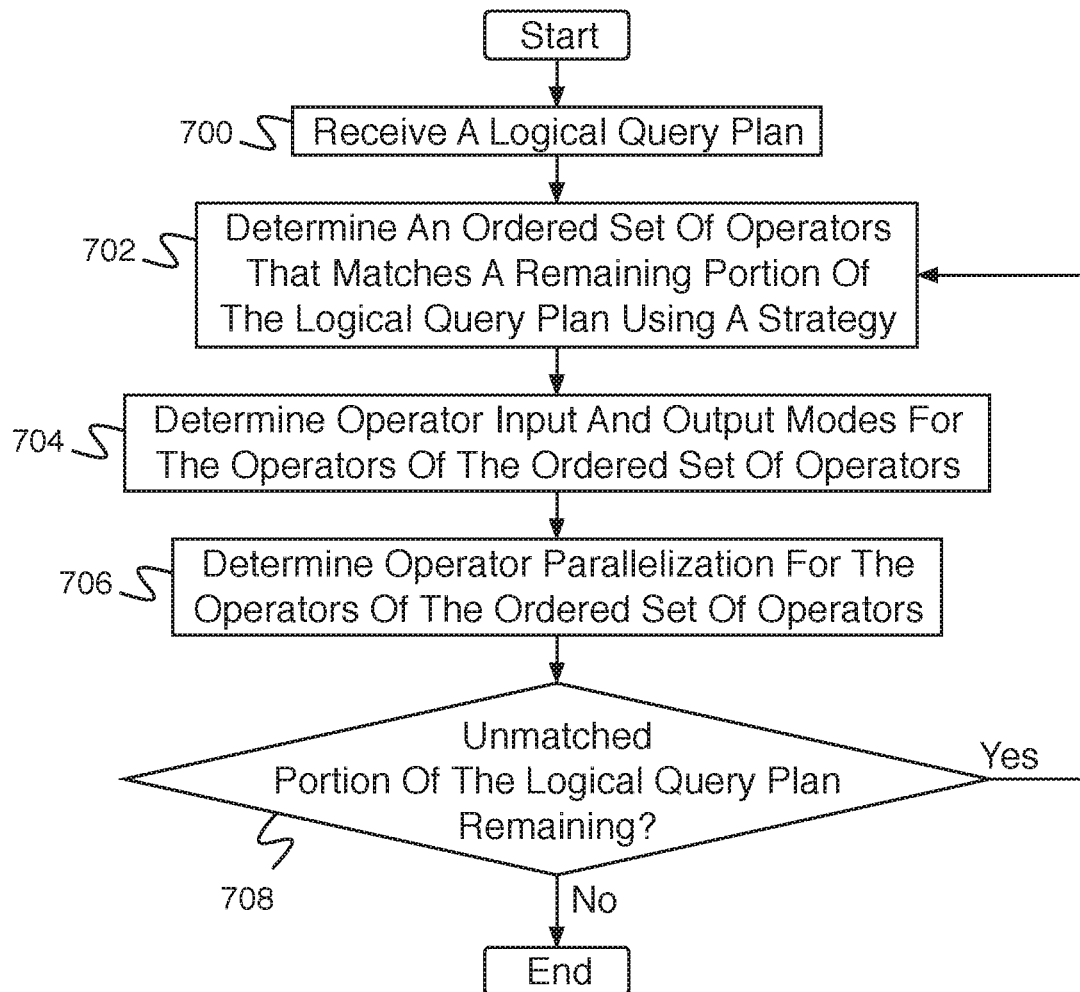
FIG. 7 is a flow diagram illustrating an embodiment of a process for determining a physical query plan based at least in part on a logical query plan.

FIG. 7 is a flow diagram illustrating an embodiment of a process for determining a physical query plan based at least in part on a logical query plan. In some embodiments, the process of FIG. 7 implements 608 of FIG. 6. In the example shown, in 700, a logical query plan is received. In 702, an ordered set of operators is determined that matches a remaining portion of the logical query plan using a strategy. In some embodiments, a strategy indicates an ordered set of one or more operators corresponding to one or more elements of the logical query plan. In some embodiments, a strategy is based at least in part on a cost function. In some embodiments, the ordered set of operators is based at least in part on a cost function. In 704, operator input and output modes are determined for the operators of the ordered set of operators. In some embodiments, operator input and output modes are indicated by the strategy. In some embodiments, operator input and output modes are based at least in part on a cost function. In some embodiments, an operator input mode is determined to be the same as the operator output mode of a previous operator. In 706, operator parallelization is determined for the operators of the ordered set of operators. In some embodiments, operator parallelization is indicated by the strategy. In some embodiments, operator parallelization is based at least in part on a cost function. In 708, it is determined whether there is an unmatched portion of the logical query plan remaining (e.g., a portion of the logical query plan that has not been matched to an ordered set of operators). In the event it is determined that there is an unmatched portion of the logical query plan remaining, control passes to 702. In the event it is determined that there is not an unmatched portion of the logical query plan remaining, the process ends.

In some embodiments, a logical query plan includes a set of ordered operators. For example, a logical query plan includes an indication of an operation of receiving input data and outputting that data, an indication of an operation of processing data and outputting that processed data, and an indication of an operation of more processing of the data and outputting that further processed data (e.g., Logical Query Plan: Input→Order By→Limit). In some embodiments, the logical query plan is converted to one or more physical query plans. For example, one or more physical query plans including an indication of an operation of receiving input data and outputting that data, one or more indications of an operation of processing data and outputting that processed data (e.g., Physical Query Plan 1: Input(A)→StatefulTopK(C); Physical Query Plan 2: Input(A)→SaveRestore(C)→Sort(C)→Limit(C); etc.).

In some embodiments, a cost function comprises a cost function for indication higher and lower cost physical query plan options. In various embodiments, a cost is associated with an operator (e.g., different operators have different associated cost), with an input or output mode, with a parallelization level, or with any other physical query plan choice. In some embodiments, a complete mode associated with an operator is associated with a high cost of the cost function. In various embodiments, a cost function is based at least in part on a trigger interval, an estimate of the input data size, an estimate of the operator processing time, or any other appropriate factor. In various embodiments, the cost function is based at least in part on one or more of the following: a number of tuples, a number of tuples in a batch, a cardinality of stateful columns, a sum of operator costs, a sum or all operator costs, one or more weights, or any other appropriate factor. In some embodiments, a cost function comprises:

Inputs: # of tuples in each batch, estimated cardinality of each column

Cost of Stateless Operator=weight1*# tuples

Figure 8:
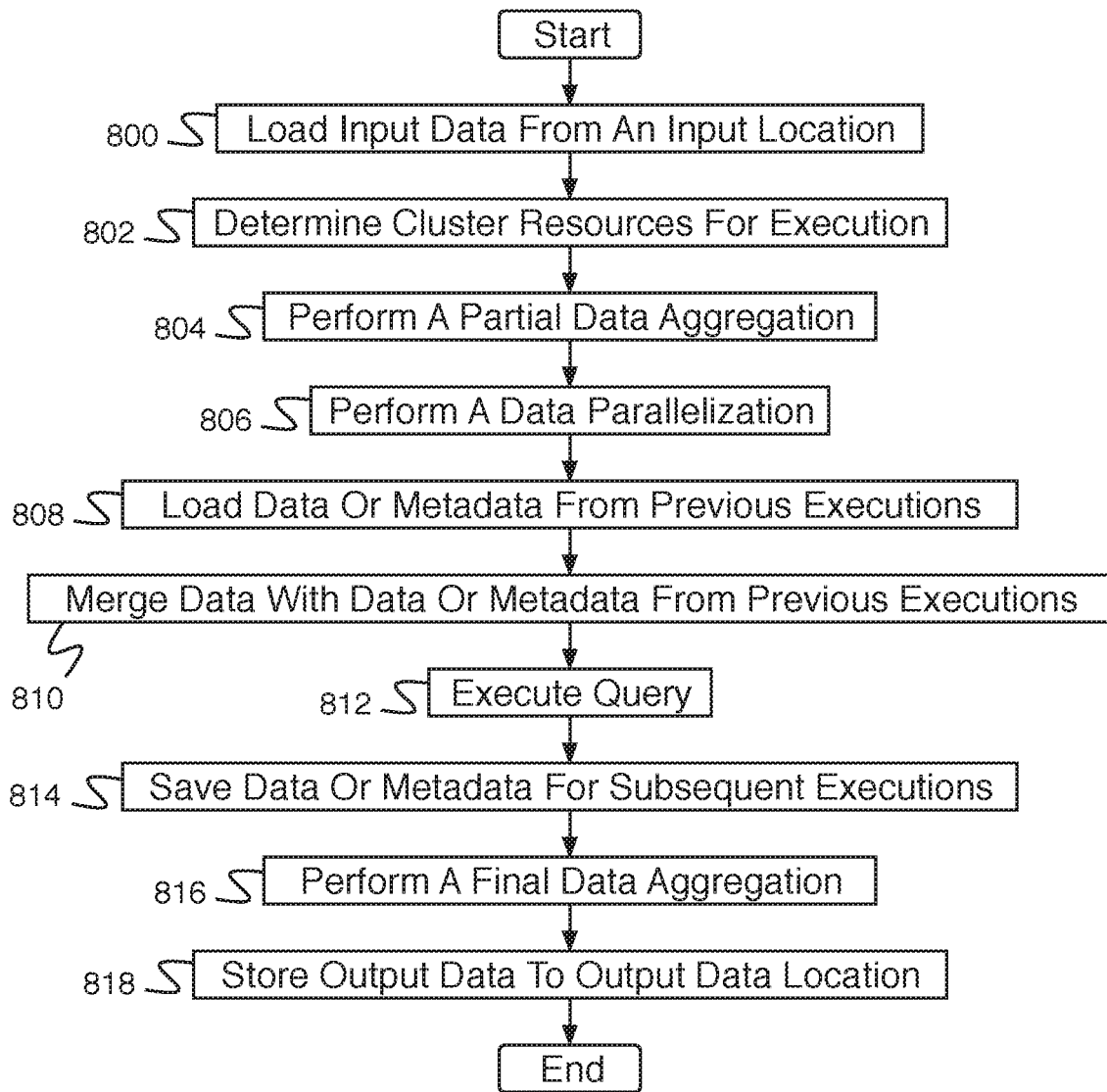
FIG. 8 is a flow diagram illustrating an embodiment of a process for executing a query plan.

Cost of Stateful Operator=weight2*# tuples+ weight3*cardinality of stateful columns Cost of Plan=Sum of all operator costs FIG. 8 is a flow diagram illustrating an embodiment of a process for executing a query plan. In some embodiments, the process of FIG. 8 implements 610 of FIG. 6. In the example shown, in 800, input data is received from an input location. For example, stored input data is received from input location in an input table. In 802, cluster resources for execution are determined. In some embodiments, cluster resources for execution comprise available worker machines, available processors, available processing capacity on a processor or machine, available virtual machines, or any other appropriate cluster resources for execution. In 804, a partial data aggregation is performed. A partial data aggregation comprises grouping related data. In some embodiments, a partial data aggregation comprises counting groups of data. In various embodiments, related data comprises data received at a related time, data received from related users, data that is similar, or data related in any other appropriate way. In 806, a data parallelization is performed. For example, data parallelization comprises dividing data between computers, processors, virtual machines, networks, etc., such that it can be processed in parallel. In some embodiments, preference is given to maintain locality on a particular machine for data in the same group. For example, data and/or processing is stored or collocated on a given hardware storage or processor (e.g., to avoid unnecessary data transfer over the network). In some embodiments, data parallelization is based at least in part on a parallelization level (e.g., an indication of how many locations to divide the data between, an indication of how much data to deliver to a given location, etc.). In some embodiments, data determined to be part of the same group (e.g., in 804) is delivered to the same location. In 808, data or metadata from previous executions is loaded. In various embodiments, data or metadata is located from an output data location, a distributed storage system, a local storage, a cluster storage, or any other appropriate location. In 810, data is merged with data or metadata from previous executions. In 812, the query is executed. Executing the query comprises executing the ordered set of operators (e.g., in order) using the operator input mode and the operator output mode for each operator. In 814, data or metadata is saved for subsequent operations. In 816, a final data aggregation is performed (e.g., combining the results of the parallel execution into a single result, e.g., to determine output data). In 818, output data is stored to an output data location.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for executing a streaming query, comprising:
   an interface configured to:
      receive a logical query plan; and
   a processor configured to:
      determine a physical query plan based at least in part on the logical query plan, wherein the physical query plan comprises an ordered set of operators, wherein each operator of the ordered set of operators comprises an operator input mode and an operator output mode, wherein the operator input mode or the operator output mode comprise one of: a complete mode, an append mode, a delta mode, or an update mode, wherein the complete mode processes all of the input data and outputs the entire result of the physical query plan, wherein the delta mode incrementally outputs results at user specified intervals comprising instructions to only add a row to an output table or delete a row from the output table, wherein the append mode incrementally outputs results at user specified intervals comprising instructions to only output a new row to the output table and does not output instructions to delete a row from the output table, and wherein the update mode incrementally outputs results at user specified intervals comprising instructions to output a new row to the output table and is able to output modifications to only a set of rows of the output table; and
      execute the physical query plan using the operator input mode and the operator output mode for each operator of the query.

2. The system of claim 1, wherein the interface is further configured to receive a set of input sources.

3. The system of claim 1, wherein the interface is further configured to receive an input location.

4. The system of claim 1, wherein the interface is further configured to receive a trigger interval at which an output should be provided.

5. The system of claim 4, wherein the trigger interval comprises one of: once per minute, once per 30 minutes, each time an input is received, or as often as possible.

6. The system of claim 1, wherein the interface is further configured to receive an output data location.

7. The system of claim 1, wherein the operator input mode is selected from a set of input modes associated with an operator of the physical query plan.

8. The system of claim 1, wherein the operator output mode is selected from a set of output modes associated with an operator of the physical query plan.

9. The system of claim 1, wherein the operator input mode is determined to be the same as the operator output mode of a previous operator.

10. The system of claim 1, wherein the operator input mode and the operator output mode are selected based at least in part on a cost function.

11. The system of claim 10, wherein the complete mode associated with an operator is associated with a high cost of the cost function.

12. The system of claim 10, wherein the cost function comprises a sum of operator costs.

13. The system of claim 10, wherein the cost function is based at least in part on a trigger interval.

14. The system of claim 10, wherein the cost function is based at least in part on an estimate of an input data size.

15. The system of claim 1, wherein the processor is further configured to determine parallelization of the physical query plan.

16. The system of claim 15, wherein the determining of the parallelization of the physical query plan comprises determining an input data segmentation.

17. The system of claim 16, wherein determining the input data segmentation comprises determining an input data grouping.

18. The system of claim 1, wherein executing the physical query plan comprises determining cluster resources for execution.

19. The system of claim 1, wherein executing the physical query plan comprises loading data or metadata from previous executions.

20. The system of claim 1, wherein executing the physical query plan comprises saving data or metadata for subsequent executions.

21. A method for executing a streaming query, comprising:
   receiving a logical query plan;
   determining, using a processor, a physical query plan based at least in part on the logical query plan, wherein the physical query plan comprises an ordered set of operators, wherein each operator of the ordered set of operators comprises an operator input mode and an operator output mode, wherein the operator input mode or the operator output mode comprise one of: a complete mode, an append mode, a delta mode, or an update mode, wherein the complete mode processes all of the input data and outputs the entire result of the physical query plan, wherein the delta mode incrementally outputs results at user specified intervals comprising instructions to only add a row to an output table or delete a row from the output table, wherein the append mode incrementally outputs results at user specified intervals comprising instructions to only output a new row to the output table and does not output instructions to delete a row from the output table, and wherein the update mode incrementally outputs results at user specified intervals comprising instructions to output a new row to the output table and is able to output modifications to only a set of rows of the output table; and executing the physical query plan using the operator input mode and the operator output mode for each operator of the query.

22. A computer program product for executing a streaming query, the computer program product being embodied in a tangible computer readable non-transitory storage medium and comprising computer instructions for:

receiving a logical query plan;

determining a physical query plan based at least in part on the logical query plan, wherein the physical query plan comprises an ordered set of operators, wherein each operator of the ordered set of operators comprises an operator input mode and an operator output mode, wherein the operator input mode or the operator output mode comprise one of: a complete mode, an append mode, a delta mode, or an update mode, wherein the complete mode processes all of the input data and outputs the entire result of the physical query plan, wherein the delta mode incrementally outputs results at user specified intervals comprising instructions to only add a row to an output table or delete a row from the output table, wherein the append mode incrementally outputs results at user specified intervals comprising instructions to only output a new row to the output table and does not output instructions to delete a row from the output table, and wherein the update mode incrementally outputs results at user specified intervals comprising instructions to output a new row to the output table and is able to output modifications to only a set of rows of the output table; and executing the physical query plan using the operator input mode and the operator output mode for each operator of the query.

\* \* \* \* \*